United States Patent [19]

Satoh

[11] Patent Number: 5,696,652

[45] Date of Patent: Dec. 9, 1997

[54] MAGNETIC HEAD DEVICE USING AN ADHESIVE HAVING BOTH PHOTOSETTING AND THERMOSETTING PROPERTIES, AND METHOD FOR PRODUCING SAME

[75] Inventor: Hidezi Satoh, Niigata-ken, Japan

[73] Assignee: Alps Electric Co., Ltd., Tokyo, Japan

[21] Appl. No.: 670,863

[22] Filed: Jun. 26, 1996

[30] Foreign Application Priority Data

Jul. 6, 1995 [JP] Japan .................................. 7-170960

[51] Int. Cl.⁶ .................................................. G11B 5/48
[52] U.S. Cl. .................................................. 360/104
[58] Field of Search ........................... 360/103, 104, 360/125, 126

[56] References Cited

U.S. PATENT DOCUMENTS

| | | | |
|---|---|---|---|
| 4,920,438 | 4/1990 | Furukawa et al. | 360/104 |
| 4,992,898 | 2/1991 | Wanlass | 360/104 |
| 5,021,907 | 6/1991 | Zak | 360/104 |
| 5,215,608 | 6/1993 | Stroud et al. | 360/104 |
| 5,434,731 | 7/1995 | Hagen | 360/104 |
| 5,473,488 | 12/1995 | Gustafson et al. | 360/104 |
| 5,508,863 | 4/1996 | Goto et al. | 360/104 |

FOREIGN PATENT DOCUMENTS 6-60346A  4/1994  Japan .

*Primary Examiner*—Jefferson Evans
*Attorney, Agent, or Firm*—Guy W. Shoup; Patrick T. Bever

[57] ABSTRACT

A magnetic head device whose slider and supporting plate are bonded and affixed together by the use of an adhesive having both photosetting and thermosetting properties. The slider has mounted thereto a magnetic detection section. It is preferable to apply a thermosetting resin to a portion other than those portions to which the adhesive with both photosetting and thermosetting properties has been applied. At one end of the supporting plate where the junction of a tongue, one end of which is a free end, and a slider is provided, the adhesive with both the photosetting and thermosetting properties is applied toward the free end of the tongue, while the thermosetting adhesive is applied toward a base end of the tongue.

12 Claims, 4 Drawing Sheets

MAGNETIC HEAD DEVICE USING AN ADHESIVE HAVING BOTH PHOTOSETTING AND THERMOSETTING PROPERTIES, AND METHOD FOR PRODUCING SAME

BACKGROUND OF THE INVENTION

1. Field of the Invention

The present invention relates to a magnetic head device, such as a flying magnetic head device, for use in a hard disk apparatus or a magneto-optic disk apparatus, in which a slider with a magnetic detection section is bonded and affixed to a supporting plate. More particularly, the invention relates to a magnetic head device and a method of producing the same, in which the slider and the supporting plate can be easily bonded together and the bonding between the slider and the supporting plate is of sufficient strength.

2. Description of the Related Art

In a flying magnetic head device used, for example, in a hard disk apparatus, a supporting plate, called a flexure, is mounted to an end of a load beam biased in the direction of a recording medium, and a slider is bonded and affixed to the supporting plate.

Hitherto, a thermosetting adhesive, such as an epoxy-type adhesive, has been used to bond the supporting plate and the slider together. In the bonding, the thermosetting adhesive is applied between the supporting plate and the slider, and the supporting plate and the slider are positioned and held together by a jig. Then, the thermosetting adhesive between the supporting plate and the slider are heated in order to bond the plate and the slider together.

In the above-described bonding process, however, it is necessary to continue holding the supporting plate and the slider by the jig in all of the bonding steps, from the step of positioning the plate and the slider, followed by the step of heating the adhesive in a heating furnace, and to the step of cooling the thermosetting adhesive after it has been heated. Thus, a large number of jigs must be provided per line, resulting in a problem of higher facility costs.

To overcome such a problem, the supporting plate and the slider can be bonded together by utilizing both the thermosetting adhesive and a UV setting adhesive. Such a method of producing a magnetic head device is disclosed, for example, in Japanese Patent Laid-Open No. 6-60346.

In the method, the thermosetting adhesive and the UV setting adhesive are both applied between the supporting plate and the slider. With the supporting plate and the slider being positioned, the junction thereof is exposed to ultraviolet light in order to harden the UV setting adhesive. Then, the supporting plate and the slider bonded together by the UV setting adhesive is heated in order to harden the thermosetting adhesive, thereby completing the bonding and fixing together of the slider and the supporting plate.

However, only those portions of the UV setting adhesive exposed to ultraviolet light are hardened, so that it is difficult to harden the adhesive completely. Therefore, there is reduced bonding strength between the supporting plate and the slider, when UV setting adhesive is used. When both the UV thermosetting adhesive and the thermosetting adhesive are used together, the two different types of adhesives are applied to different portions of the junction of the supporting plate and the slider. Therefore, as described above, in the area where UV setting adhesive is applied, there is low bonding strength, and the thermosetting adhesive is confined to a smaller area. Consequently, the overall bonding strength at the junction of the slider and the supporting plate cannot be made sufficiently large.

In the method of Japanese Patent Laid-Open No. 6-60346, in order to expose the UV setting adhesive to enough ultraviolet light, the UV setting adhesive is applied to the portion of the junction of the supporting plate (flexure) and the slider that does not overlap the load beam, while the thermosetting adhesive is applied to the portion thereof that overlaps the load beam. A hole is opened in the supporting plate (flexure) in order to make more efficient hardening of the UV setting adhesive that is exposed to ultraviolet light from the load beam side.

However, it is still difficult to expose the entire UV setting adhesive even when a hole is formed in the supporting plate, so that this method has a limit as to how much the hardening of the UV setting adhesive can be accelerated. In addition, since the ultraviolet light is applied with respect to the supporting plate from the load beam side, the UV setting adhesive can only be applied to portions that do not overlap the load beam. As illustrated in FIG. 2, in the levitated magnetic head device the supporting plate (flexure) has a tongue that is connected to the slider. In addition, the load beam extends toward a free end of the tongue or downward in FIG. 2 (refer to FIG. 3). Accordingly, when, as described above, the UV setting adhesive is applied to the portion that does not overlap the load beam, the UV setting adhesive can only be applied toward a base end of the tongue, so that the thermosetting adhesive can only be applied to the free end of the tongue.

As illustrated in FIG. 3, the tongue is in a bent state at the base end serving as fulcrum, so that the surface stress is larger at the base end. Application of the UV setting adhesive with a weak adhesive strength to the base end with a large stress causes bending stress from the tongue to constantly act upon the UV setting adhesive. This results in more frequent peeling of the slider and thus a weaker overall adhesive strength between the tongue and the slider.

SUMMARY OF THE INVENTION

In order to overcome the above-described prior art problems, an object of the present invention is to provide a magnetic head device and a method of producing the same in which the slider and the supporting plate can be temporarily bonded together while in alignment, and in which the slider and the supporting plate can eventually be firmly bonded together.

Another object of the present invention is to make it possible to provide sufficient adhesive strength between the supporting plate and the slider by proper selection of the portions for applying the different types of adhesives.

A further object of the present invention is to make it possible to ground the slider to the supporting plate at their junction in order to eliminate the problem of electrostatic breakdown and the like.

To these ends, according to one aspect of the present invention, there is provided a magnetic head device comprising a slider and a supporting plate bonded and affixed together, said slider being provided with a magnetic detection section, wherein an adhesive having both photosetting and thermosetting properties is applied to a junction of said slider and said supporting plate.

Preferably, the magnetic head device is one in which a thermosetting adhesive is applied to a portion of said junction, other than the portion of said junction to which said adhesive having both photosetting and thermosetting properties is applied.

Further, the magnetic head device may be one in which a conductive adhesive is applied to a portion of the junction not occupied by the adhesive with both photosetting and thermosetting properties and the thermosetting adhesive to electrically connect the slider and the supporting plate. The portion to which the conductive agent is applied is located between the portions of the junction to which the adhesive with both photosetting and thermosetting properties and the thermosetting adhesive are applied.

Preferably, the magnetic head device is one in which said supporting plate is provided with a tongue, one end of which is a free end, that is bonded to said slider at the junction thereof, and wherein said adhesive with both photosetting and thermosetting properties is applied to the free end side of said tongue forming said junction with said supporting plate, and said thermosetting adhesive is applied to a base end side of said tongue.

To these ends, according to another aspect of the present invention, there is provided a method of producing a magnetic head device, comprising the steps of: (1) applying an adhesive with both photosetting and thermosetting properties to a junction of said slider and said supporting plate, said slider being provided with a magnetic detection section; (2) temporarily hardening said adhesive by applying light to said junction; and (3) further hardening said adhesive by heating said junction after temporarily hardening said adhesive.

Preferably, the method of producing the magnetic head device is one in which a thermosetting adhesive is applied to a portion of said junction, other than the portion of said junction to which said adhesive with both photosetting and thermosetting properties is applied, and both of said adhesive with both photosetting and thermosetting properties and said thermosetting adhesive are hardened by heating said junction. More preferably, the method of producing the magnetic head device is one in which said supporting plate is provided with a tongue, one end of which is a free end, that forms a junction with said slider, and wherein said adhesive with both photosetting and thermosetting properties is applied to the free end said of said tongue, and said thermosetting adhesive is applied to a base end side of said tongue. Further, the method of producing the magnetic head may be one in which a conductive adhesive is applied to a portion of the junction, other than the portions of the junction to which the other two types of adhesives are applied, in order to electrically connect the supporting plate and the slider.

Still further, the method of producing the magnetic head may be one in which light is applied from a side of the junction of the slider and the supporting plate, when the adhesive with both photosetting and thermosetting properties is being temporarily hardened.

DESCRIPTION OF THE PREFERRED EMBODIMENTS

Figure 1:
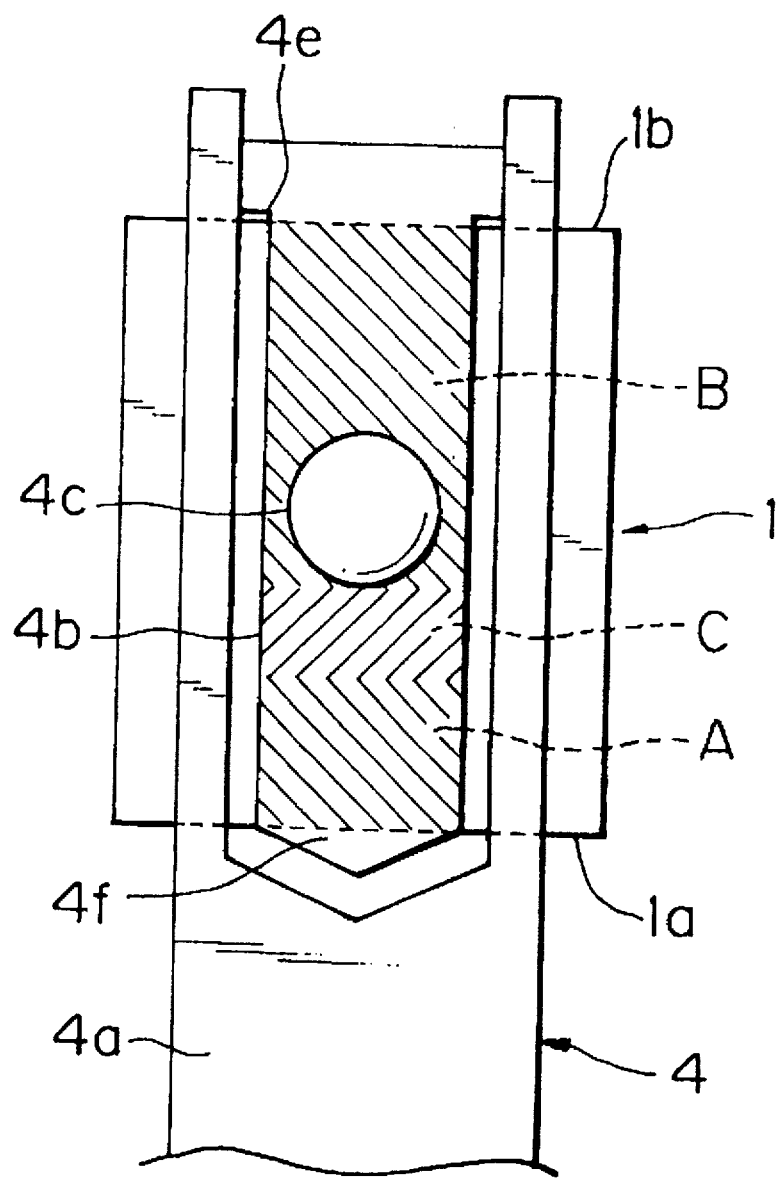
FIG. 1 is a plan view of a bonding structure of a slider and a supporting plate in a first embodiment of the present invention.

In the present invention, an adhesive with both photosetting and thermosetting properties is applied to the junction of the supporting plate and the slider. The adhesive is applied to the junction, the slider is positioned by a jig to where it is to be bonded to the supporting plate, and the junction is exposed to light in order to temporarily harden the adhesive. Then, the supporting plate and the slider having applied therebetween the temporarily hardened adhesive is removed from the jig, and transferred to a heating furnace, or the like, where the adhesive is heated and further hardened. Accordingly, the adhesive that has been exposed to light and temporarily hardened is further hardened, whereby the supporting plate and the slider are firmly bonded together after the thermosetting.

When a thermosetting adhesive is applied to an area other than the area where the aforementioned adhesive with photosetting and thermosetting properties is applied, the thermosetting adhesive is hardened in the heating step. Accordingly, the supporting plate and the slider are bonded together with a high adhesive strength by temporarily hardening the adhesive by light exposure and hardening the thermosetting adhesive by heating.

When a magnetoresistance effect device having a layered structure of thin films is used for the magnetic detection section provided on the slider, the static electricity produced is weak. In such a case, a conductive adhesive is applied to the junction of the slider and the supporting plate. Preferably, the conductive adhesive is applied between the area where the adhesive with photosetting and thermosetting properties is applied and the area where the thermosetting adhesive is applied. The conductive adhesive electrically connects the slider and the supporting plate to prevent electrostatic breakdown of the magnetic detection section provided on the slider.

A conductive adhesive conductive resin may be used as the conductive adhesive. The conductive adhesive is one in which a conductive filler, such as silver, is mixed in a thermosetting resin, such as epoxy resin. When thermosetting resin, used as binder, is used as the conductive adhesive, the conductive adhesive is thermally hardened along with the adhesive with photosetting and thermosetting properties and the thermosetting adhesive, in the heating step, whereby the supporting plate and the slider are bonded together also by the conductive adhesive.

The adhesive with the photosetting and thermosetting properties is hardened by light exposure only to the extent that is enough to temporarily bond together the supporting plate and the slider. Therefore, for example, light can be applied from a side of the junction of the slider and the supporting plate in order to harden the adhesive protruding out from the junction. When the method of applying light from the side of the junction is adopted, the adhesive with the photosetting and thermosetting properties can be applied to any portion, so that it is possible to apply the adhesive, for example, to a portion of the junction that overlaps the load beam.

Accordingly, as illustrated in FIG. 1, the adhesive with the photosetting and thermosetting properties can be applied to a free end of a tongue of the supporting plate (flexure), and the thermosetting resin can be applied to a base end of the tongue. Applying light to the adhesive, with the photosetting and thermosetting properties, applied to a portion of the tongue that overlaps the load beam allows temporary hardening of the adhesive between the supporting plate and the slider. In the next heating step, the adhesive with the photosetting and thermosetting properties and the thermosetting adhesive are both hardened. Accordingly, when the thermosetting adhesive with a high adhesive strength is applied to the base end of the tongue, the portion of the tongue with the largest bending stress is firmly bonded to the slider with the thermosetting adhesive, thus resulting in less frequent peeling between the slider and the supporting plate, and increased overall adhesive strength.

In the method of producing magnetic head devices in which a conductive adhesive, is applied between the supporting plate and the slider, it is preferable to apply the thermosetting adhesive to the base end of the tongue, and then apply the adhesive with the photosetting and thermosetting properties to the free end of the tongue; or to apply the adhesive with the photosetting and thermosetting properties first, and then apply the conductive adhesive. Among the three types of adhesives, the adhesive with the photosetting and thermosetting properties and the conductive adhesive have lower adhesive strengths compared to the thermosetting adhesive, so that these two adhesives with lower adhesive strengths are applied to the free end of the tongue, while the thermosetting adhesive is applied to the base end of the tongue. This makes it possible to firmly bond the portion of the tongue with higher bending stress to the slider, and thus obtain a higher adhesive strength between the supporting plate and the slider.

A description will now be given of the present invention, with reference to the figures.

Figure 2:
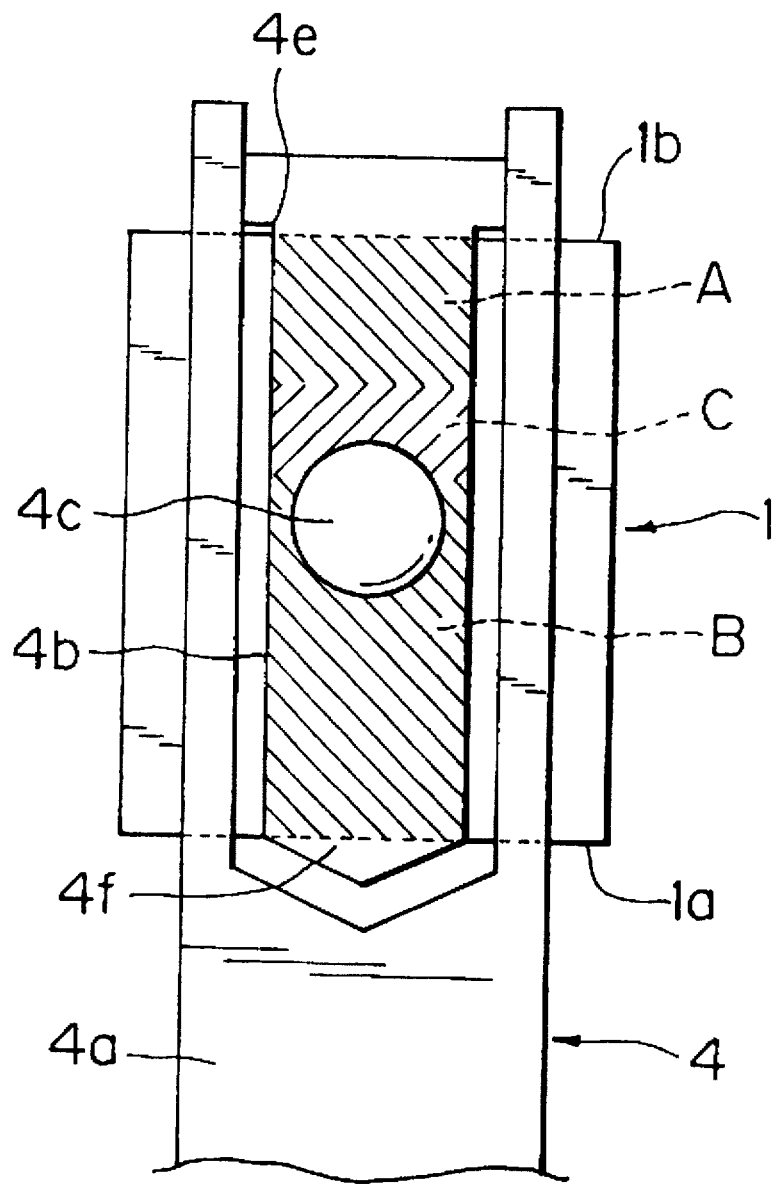
FIG. 2 is a plan view of a bonding structure of a slider and a supporting plate in a second embodiment of the present invention.
Figure 3:
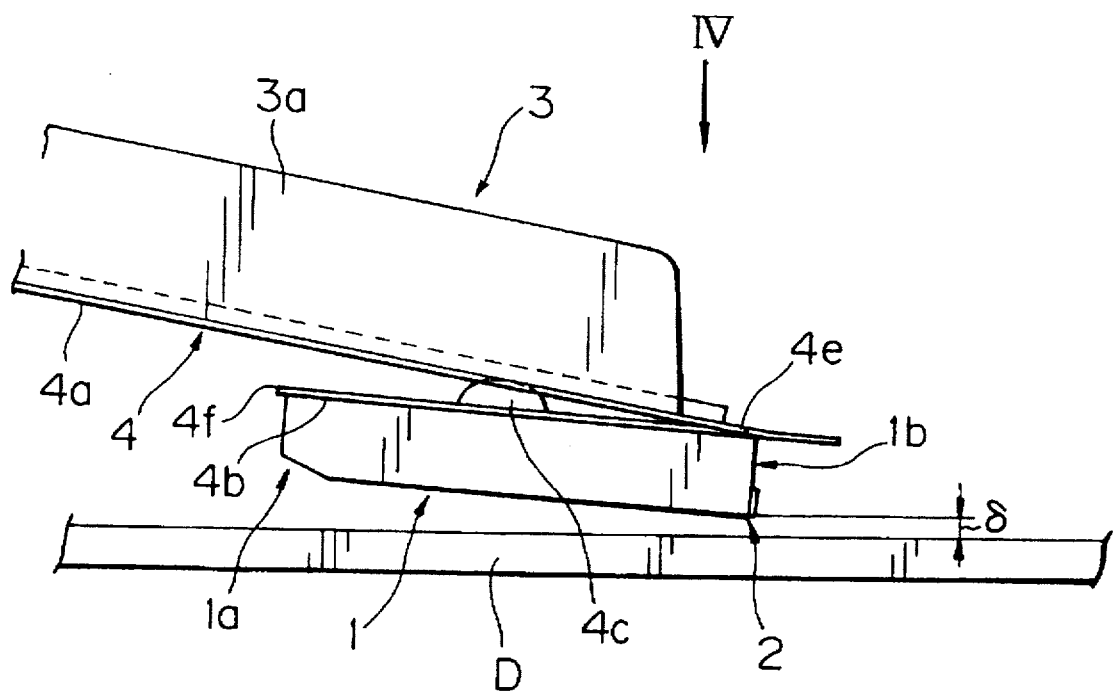
FIG. 3 is a side elevational view of a levitated head.

FIG. 1 is a plan view of the bonding structure of the supporting plate and the slider in a flying magnetic head device for use in a hard disk apparatus in an embodiment of the present invention; FIG. 2 is a plan view of a bonding structure of the supporting plate and the slider in another embodiment of the present invention; FIG. 3 is a side elevational view of the levitated magnetic head device; and FIG. 4 is a plan view taken along arrow IV of FIG. 3.

Figure 4:
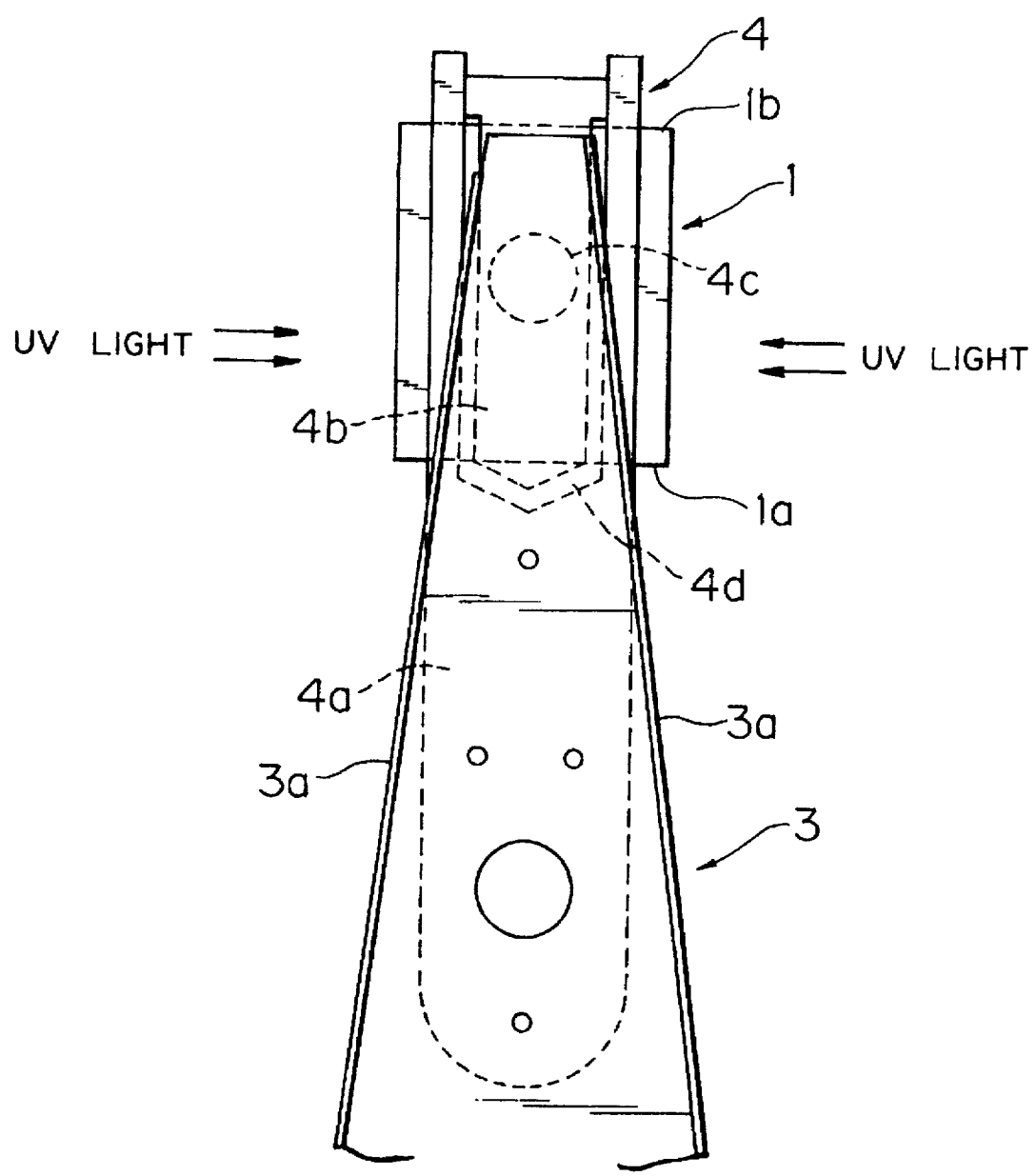
FIG. 4 is a plan view taken along arrow IV of FIG. 3.

The flying magnetic head device illustrated in FIGS. 3 and 4 is provided with a slider 1. The slider 1 is composed of conductive ceramic material such as alumina-titanium carbide composites. FIG. 3 illustrates the slider opposed to a hard disk D. The disk D moves toward the right side of the figure. Air currents produced between the bottom face of the slider 1 and the surface of the disk D cause the slider 1 to fly above the surface of the disk D. In the figure, the left side of the slider 1 is a leading end section 1a, and the right side thereof is a trailing end section 1b.

A magnetic detection section 2 is provided at the trailing end section 1b of the slider 1, and has a thin film structure employing a magnetoresistance effect device. The surface of the magnetoresistance effect device is provided with an inductive-type signal recording section with a thin-film structure. In FIG. 3, the flying distance between the magnetic detection section 2 at the trailing end 1b and the surface of the disk D is expressed as δ.

The magnetic head device is provided with a load beam 3 that holds the aforementioned slider 1. The load beam 3 is composed of a metallic plate having resiliency, and has a wall section 3a provided on each side of the portion where the slider 1 is mounted, with each wall 3a being formed by bending the load beam 3. The wall sections 3a being almost rigid sections. The base end of the load beam 3 has no such wall section 3a, with the portion having no such wall sections 3a exhibiting resiliency produced by spring deformation. The resilient forces causes the slider 1 to be pressed very lightly against the surface of the disk D. As illustrated in FIG. 3, while the disk D is rotating and moves, the slider flies in opposition to the pressing force.

A supporting plate 4, called a flexure, is mounted to a bottom end of the load beam 3. The supporting plate 4 is composed of a thin metallic plate with resiliency. A body 4a of the supporting plate 4 is affixed to the bottom end of the load beam 3 by spot welding. As illustrated in FIG. 4, a cut-out 4d is formed in the supporting plate 4, with the tongue 4b separated by the cutout 4d integrally formed. A base end 4e of the tongue 4b is continuously and integrally formed with the body section 4a, and the free end of the tongue 4b extends toward the base end of the load beam 3.

The upper face of the slider 1 is bonded to the bottom face of the tongue 4b. A pivot 4c protrudes out as a spherical surface from the center of the tongue 4b and toward the load beam 3, and is integrally formed therewith. The summit of the pivot 4c contacts the bottom face of the load beam 3, so as to allow the tongue 4b to be pivotally bent on the base end 4e serving as fulcrum in the direction of the disk D. This bending produces a resilient restoring force that causes the summit of the pivot 4c to be press-contacted against the bottom face of the load beam 3. The slider 1 bonded to the tongue 4b can pivotally tilt on the summit of the pivot 4c in any direction in correspondence with the shape of the surface of the disk D.

An adhesive having both photosetting (such as ultraviolet light setting) and thermosetting properties is used for the junction of the upper face of the slider 1 and the lower face of the tongue 4b. In FIGS. 1 and 2, the area for applying the adhesive having both UV setting and thermosetting properties is designated (A). The adhesive with UV setting and thermosetting properties is an adhesive, based primarily on prepolymer or oligomer, exhibiting photopolymerization and assuming a net-like structure when heated. Examples thereof include epoxy acrylate, urethane acrylate, and unsaturated polyester.

In a preferred embodiment of the present invention, a thermosetting adhesive is applied to a region, between the slider 1 and the tongue 4b, other than the region A for applying the aforementioned adhesive type, though only the aforementioned adhesive having both UV setting and thermosetting properties may be used to bond the slider 1 and the tongue 4b together. In FIGS. 1 and 2, the area for applying the thermosetting adhesive is designated (B). The thermosetting adhesive is an adhesive, based primarily on resin material, assuming a net-like structure when heated. Examples of the resins include epoxy-type, phenol-type, and urethane-type resins.

Though in the present invention, only adhesives having both UV setting and thermosetting properties, and thermosetting adhesives may be used to bond the slider 1 and the tongue 4b together, a conductive adhesive may also be used in addition to these two types of adhesives. In FIGS. 1 and 2, an area, between the slider 1 and the tongue 4b, for applying the conductive adhesive is designated C. The conductive adhesive is one in which a conductive filler material such as silver is mixed in a thermosetting binder resin such as the aforementioned epoxy-type, phenol-type, or urethane-type resins. The conductive adhesive allows electrical connection between the slider 1 and the tongue 4 in order to prevent any electrostatic breakdown of the thin film structure of the magnetic detection section 2.

The magnetic head device can be produced by applying to the junction of the supporting plate 4 and the tongue 4b, an adhesive having both UV setting and thermosetting properties, or an adhesive having both UV setting and thermosetting properties and a thermosetting resin, or the aforementioned two types of adhesives and a conductive adhesive.

In a magnetic head device in which an adhesive is applied to the junction, the tongue 4b of the supporting plate 4 and the slider 1 are held by a jig while they are in alignment. Ultraviolet light is applied to the junction where the adhesive with both UV setting and thermosetting properties has been applied. In the present invention, as illustrated in FIG. 4, the ultraviolet light is applied from the sides of the junction of the tongue 4b and the slider 1. The direction of application of the ultraviolet light is unrelated to the position of the load beam 3, so that it is possible to apply the ultraviolet light to the adhesive, no matter what part of the junction the adhesive having both UV setting and thermosetting properties is applied.

When ultraviolet light is applied in the direction of the arrows illustrated in FIG. 4, the ultraviolet light appears from the sides of the junction of the slider 1 and the tongue 4b. The adhesive, having both UV setting and thermosetting properties, that protrude out is temporarily hardened as result of photopolymerization, whereby the slider 1 and the tongue 4b are temporarily bonded together, while they are in alignment. The magnetic head device can be removed from the jig, while the slider 1 and the tongue 4b are in alignment. The magnetic head device removed from the jig is transferred to a heating furnace where the adhesive between the slider 1 and the tongue 4b is heated to a predetermined temperature. The heating hardens the adhesive having both UV setting and thermosetting properties (as well as the thermosetting adhesive and the thermosetting binder of the conductive adhesive, when these two types of adhesives are used). Accordingly, the bonding of the slider 1 and the tongue 4b is complete after thermal heating of these adhesive types used.

In the foregoing description, the adhesive having both UV setting and thermosetting properties is sufficiently heated by temporary hardening the adhesive by application of ultraviolet light thereto and further hardening the adhesive by heating.

In the embodiment of FIG. 1, when the adhesive with both UV setting and thermosetting properties, and the thermosetting adhesive are used, the area (A) for applying the adhesive with both UV setting and thermosetting properties is disposed toward the free end 4f of the tongue 4b, while the area (B) for applying the thermosetting adhesive is disposed toward the base end of the tongue 4b. On the other hand, in the embodiment illustrated in FIG. 2, the area (A) for applying the adhesive with both UV setting and thermosetting properties is disposed toward the base end 4e of the tongue 4b, while the area (B) for applying the thermosetting adhesive is disposed toward the free end 4f of the tongue 4b.

Table 1 gives a comparison between the adhesive strengths in the embodiments illustrated in FIGS. 1 and 2. Ten magnetic head device samples each were used to obtain the adhesive strengths of the magnetic head devices of the embodiments illustrated in FIGS. 1 and 2 by measuring the force required to peel away vertically the tongue 4b from the slider 1 (or top face of the slider in FIG. 3). The maximum force required for the magnetic head device of the embodiment illustrated in FIG. 1 was 286 (gf), and the minimum force required was 253 (gf). The maximum force required for the magnetic head device of the embodiment in FIG. 2 was 175 (gf), and the minimum force required was 121 (gf). The average values and the σ values are as given in Table 1.

TABLE 1

|  | FIG. 1 | FIG. 2 |
| --- | --- | --- |
| X̄ | 269.7 gf | 156.2 gf |
| δ | 11.2 gf | 18.9 gf |
| MAX. | 286 gf | 175 gf |
| MIN. | 253 gf | 121 gf |

As is clear from Table 1, the bonding structure of FIG. 1 provides a higher adhesive strength than the bonding structure of FIG. 2. This is because the adhesive strength of the adhesive between the slider 1 and the tongue 4b is higher, when the thermosetting adhesive with a high adhesive strength is applied to the base end 4e portion having a larger surface stress resulting from bending of the tongue 4b, with the tongue 4b illustrated in a bent state with respect to the body 4a of the supporting plate 4 in FIG. 3.

The adhesive strength of the thermosetting adhesive based primarily on epoxy resin, when used singly, was 250 (gf) or more, as measured by the same peeling test described above. The adhesive strength of the adhesive having both UV setting and thermosetting properties that is based primarily on epoxy acrylate resin, used in bonding the slider 1 and tongue 4b together, was about 100 (gf). The adhesive strength of the conductive adhesive in which a filler such as silver is mixed in an epoxy resin is about 100 (gf), when used singly to bond the slider and the tongue 4b together. Though the adhesive strength of the adhesive having both UV setting and thermosetting properties differs from the adhesive strength of the thermosetting adhesive by the aforementioned amount, the overall adhesive strength is higher when the thermosetting adhesive with the higher adhesive strength is applied to the base end of the tongue 4b. Consequently, when using the three types of adhesives, it is preferable that the area (B) for applying the thermosetting adhesive be disposed toward the base end 4e, the area (A) for applying the adhesive having both UV setting and thermosetting properties be disposed toward the free end 4f of the tongue 4b, and the area (C) for applying the conductive adhesive also be disposed toward the free end 4f of the tongue 4b. As mentioned above, the adhesive strengths of the adhesive, having both UV setting and thermosetting properties, and the conductive adhesive are about the same, so that the same overall adhesive strength can be obtained, even when the areas (A) and (C) are interchanged.

As illustrated in FIG. 1, when the area (A) for applying the adhesive, with both UV setting and thermosetting properties, is located at the free end 4f of the tongue 4b, the load beam 3 is disposed above the area (A). However, as shown in FIG. 4, ultraviolet light is applied from the sides of the adhesive having both UV setting and thermosetting properties, so that the ultraviolet light will not blocked by the load beam 3.

Although in the foregoing description, a flying magnetic head device for use in a hard disk apparatus was explicitly used, other types of magnetic head devices may also be used. Examples thereof include a levitated magnetic head device for use in a magneto-optic disk apparatus and a magnetic head device not of the levitated type such as a magnetic head device for use in a floppy disk drive.

What is claimed is:

1. A flying magnetic head comprising:
   a supporting plate; and
   a slider bonded at a junction to the supporting plate, the slider being provided with a magnetic detection section including a magnetoresistance effect device and an inductive-type signal recording section,
   wherein a first adhesive comprising at least one of epoxy acrylate, urethane acrylate and unsaturated polyester, and having both photosetting and thermosetting properties is applied to said junction between said slider and said supporting plate.

2. A flying magnetic head according to claim 1, wherein a thermosetting adhesive is applied to a portion of said junction, other than the portion of said junction to which said first adhesive is applied.

3. A flying magnetic head according to claim 2, wherein said supporting plate includes a body section and a tongue, the tongue having a base end connected to the body section and a free end, the free end being bonded to said slider at the junction, and wherein said first adhesive is applied to the free end of said tongue forming said junction with said supporting plate, and said thermosetting adhesive is applied to a base end of said tongue.

4. A flying magnetic head according to claim 2, wherein a conductive adhesive, that electrically connects said slider and said supporting plate, is applied to a portion of said junction, other than those portions of said junction to which said first adhesive and said thermosetting adhesive are applied, and wherein said conductive adhesive comprises a silver filler contained in at least one of an epoxy thermosetting binder, a phenol thermosetting binder and an urethane thermosetting binder.

5. A flying magnetic head according to claim 4, wherein said supporting plate includes a body section and a tongue, the tongue having a base end connected to the body section and a free end, the free end being bonded to said slider at the junction, and wherein said first adhesive is applied to the free end of said tongue forming said junction with said supporting plate, and said thermosetting adhesive is applied to a base end of said tongue.

6. A flying magnetic head according to claim 5, wherein said first adhesive and said conductive adhesive are alternately applied to the free end of said tongue.

7. A flying magnetic head according to claim 6, wherein said thermosetting adhesive is applied to the base end of said tongue, said conductive adhesive is applied to the free end of said tongue, and said first adhesive is applied to a region between the thermosetting adhesive and the conductive adhesive.

8. A flying magnetic head according to claim 1, wherein a pivot is formed on a tongue of said supporting plate.

9. A method of producing a flying magnetic head, comprising of steps of:

connecting a slider to a supporting plate by applying a first adhesive comprising at least one of epoxy acrylate, urethane acrylate and unsaturated polyester, and having both photosetting and thermosetting properties such that the first adhesive is applied to a junction of said slider and said supporting plate, said slider being provided with a magnetic detection section including a magnetoresistance effect device and an inductive-type signal recording section;

emitting light in a direction parallel to a plane defined by said junction, thereby temporarily hardening said first adhesive; and heating said junction, thereby further hardening said temporarily hardened first adhesive.

10. A method of producing a flying magnetic head according to claim 9, wherein the step of connecting further comprises applying a thermosetting adhesive to a portion of said junction, other than the portion of said junction to which said first adhesive is applied, and wherein both of said first adhesive and said thermosetting adhesive are hardened by the step of heating said junction.

11. A method of producing a flying magnetic head according to claim 10, wherein said supporting plate includes a body section and a tongue, the tongue having a base end connected to the body section and a free end that forms said junction of said supporting plate with said slider, and wherein said step of connecting includes applying said first adhesive to the free end said of said tongue, and applying said thermosetting adhesive to said base end of said tongue.

12. A method according to claim 9, wherein a pivot is formed on a tongue of said supporting plate, and the step of connecting includes connecting the slider to the tongue.

* * * * *